United States Patent
Li

(10) Patent No.: US 12,307,032 B2
(45) Date of Patent: May 20, 2025

(54) TOUCH DISPLAY PANEL AND DISPLAY DEVICE

(71) Applicants: Wuhan China Star Optoelectronics Technology Co., Ltd., Wuhan (CN); Wuhan China Star Optoelectronics Semiconductor Display Technology Co., Ltd., Wuhan (CN)

(72) Inventor: Fei Li, Wuhan (CN)

(73) Assignees: Wuhan China Star Optoelectronics Technology Co., Ltd, Wuhan (CN); Wuhan China Star Optoelectronics Semiconductor Display Technology Co., Ltd, Wuhan (CN)

( * ) Notice: Subject to any disclaimer, the term of this patent is extended or adjusted under 35 U.S.C. 154(b) by 0 days.

(21) Appl. No.: 17/312,397

(22) PCT Filed: May 21, 2021

(86) PCT No.: PCT/CN2021/095039
§ 371 (c)(1),
(2) Date: Jun. 10, 2021

(87) PCT Pub. No.: WO2022/236862
PCT Pub. Date: Nov. 17, 2022

(65) Prior Publication Data
US 2024/0427442 A1 Dec. 26, 2024

(30) Foreign Application Priority Data
May 8, 2021 (CN) .......................... 202110501605.9

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0446* (2019.05)

(58) Field of Classification Search
CPC .. G06F 3/0412; G06F 3/04164; G06F 3/0446; G06F 3/041; G06F 3/0443; H10K 59/12; H10K 59/131
See application file for complete search history.

(56) References Cited

U.S. PATENT DOCUMENTS

| | | | |
|---|---|---|---|
| 2016/0170544 A1* | 6/2016 | Wang | ................... G06F 3/04164 345/173 |
| 2017/0053591 A1 | 2/2017 | Seo et al. | |

(Continued)

FOREIGN PATENT DOCUMENTS

| | | |
|---|---|---|
| CN | 204595382 U | 8/2015 |
| CN | 105404428 A | 3/2016 |

(Continued)

*Primary Examiner* — Temesghen Ghebretinsae
*Assistant Examiner* — Sosina Abebe
(74) *Attorney, Agent, or Firm* — Nathan & Associates; Menachem Nathan

(57) ABSTRACT

An embodiment of the present application provides a touch display panel and a display device. The touch display panel disposes at least one repair line and disposes the repair line insulatively from touch wires, and the repair line includes a repair section and a connection section electrically connected each other. Extension directions of the connection section and the touch wires are the same. An orthographic projection of the touch wire corresponding to the repair section on the touch display panel partially coincides with an orthographic projection of the repair section on the touch display panel.

16 Claims, 6 Drawing Sheets

(56) References Cited

U.S. PATENT DOCUMENTS

2017/0185223 A1\* 6/2017 Lu .......................... G06F 3/0412
2017/0249050 A1\* 8/2017 Xi ....................... G06F 3/04164

FOREIGN PATENT DOCUMENTS

CN 109143702 A 1/2019
CN 110543053 A 12/2019

\* cited by examiner

TOUCH DISPLAY PANEL AND DISPLAY DEVICE

FIELD OF INVENTION

The present application relates to a field of display technologies, especially to a touch display panel and a display device.

BACKGROUND OF INVENTION

With display technologies of organic light emitting diode (OLED) continuing to mature, a direct on-cell touch (DOT) structure directly manufacturing a touch structure on a thin film encapsulation layer is also applied extensively. At present, as a resolution of the OLED display panel becomes increasingly higher, a width of touch signal wires in a DOT structure becomes narrower such that a circuit is broken easily when structures such as small particles exist under the touch signal wires, which results in failure of a touch function. Furthermore, such issue of broken touch signal wires is only discovered when module inspection is performed such that repair cannot be implement and a product yield is reduced.

Therefore, a touch display panel and a display device are urgently needed to solve the above technical issue.

SUMMARY OF INVENTION

Technical Issue

The technical issue is that touch wires of a conventional touch display panel are easily broken and cannot be inspected and repaired during production.

Technical Solution

The embodiment of the present application provides a touch display panel, comprising a plurality of touch electrode sets, a plurality of touch wires and at least one repair line;
wherein each of the touch electrode sets comprises a plurality of touch electrodes disposed insulatively; adjacent two of the touch wires are disposed insulatively from each other, one of the touch wires corresponds to one of the touch electrode sets, and is connected to one of the touch electrodes in a corresponding one of the touch electrode sets; the repair line is disposed insulatively from the touch wires, the repair line comprises a repair section and a connection section electrically connected to each other, and an extension direction of the connection section is the same as an extension direction of the touch wires;
wherein the repair section corresponds to at least one of the touch wires, and an orthographic projection of the touch wire corresponding to the repair section on the touch display panel partially coincides with an orthographic projection of the repair section on the touch display panel.

In the touch display panel provided by the embodiment of the present application, the touch display panel comprises a displaying region and a non-displaying region surrounding the displaying region; the touch electrode sets are located in the displaying region, the touch electrode sets are disposed along a first direction, the touch electrodes in each of the touch electrode sets are disposed along a second direction; the extension directions of the touch wires and the connection section are parallel to the second direction, a first end of the connection section and a first end of the touch wires extend along the second direction from the displaying region to the non-displaying region; an orthographic projection of the touch wires on a corresponding one of the touch electrode sets coincides with each of the touch electrodes of the corresponding one of the touch electrode sets; and the repair section is located in the non-displaying region, and an orthographic projection of some of the touch wires located in the non-displaying region on the touch display panel partially coincides with the orthographic projection of the repair section on the touch display panel.

In the touch display panel provided by the embodiment of the present application, the touch display panel comprises an underlay, a first metal layer located on the underlay, an insulation layer located on the first metal layer, and a second metal layer located on the insulation layer, the touch wires are located on the first metal layer, and the touch electrodes are located on the second metal layer; and
wherein a plurality of first via holes are defined in the insulation layer, and each of the touch wires is electrically connected to one of the touch electrodes in the touch electrode sets through one of the first via holes.

In the touch display panel provided by the embodiment of the present application, the connection section and the repair section in the repair line are disposed in a same layer.

In the touch display panel provided by the embodiment of the present application, the connection section and the touch wires in the repair line are disposed in a same layer, and the connection section and the touch electrodes in the repair line are disposed in a same layer.

In the touch display panel provided by the embodiment of the present application, a conductive pad is disposed in an overlapping region of the touch wires and the repair line.

In the touch display panel provided by the embodiment of the present application, the repair line is at least one of metal line or metal oxide line.

In the touch display panel provided by the embodiment of the present application, the touch electrode sets form a touch electrode array, and the connection section in the repair line is disposed between adjacent two of the touch electrode sets or is located outside the touch electrode array.

In the touch display panel provided by the embodiment of the present application, the touch electrode sets form a touch electrode array, and the connection section in the repair line is disposed between adjacent two of the touch electrode sets or is located outside the touch electrode array.

In the touch display panel provided by the embodiment of the present application, the repair line comprises a first repair line and a second repair line, the first repair line comprises a first repair section and a first connection section electrically connected to each other, and the second repair line comprises a second repair section and a second connection section electrically connected to each other; and
wherein an orthographic projection of the first repair section on the touch display panel coincides with an orthographic projection of M of the touch wires on the touch display panel, an orthographic projection of the second repair section on the touch display panel coincides with an orthographic projection of N of the touch wires on the touch display panel, N is a positive integer greater than or equal to 1, and M is greater than or equal to N.

Correspondingly, the embodiment of the present application also provides a display device, the display device comprises a touch display panel and a touch chip; wherein each of the touch wires is electrically connected to the touch chip, a first end of the connection section is electrically connected to the repair section, and a second end of the connection section is electrically connected to the touch chip;

wherein the touch display panel comprises: a plurality of touch electrode sets, a plurality of touch wires and at least one repair line;

wherein each of the touch electrode sets comprises a plurality of touch electrodes disposed insulatively; adjacent two of the touch wires are disposed insulatively from each other, one of the touch wires corresponds to one of the touch electrode sets, and is connected to one of the touch electrodes in a corresponding one of the touch electrode sets; the repair line is disposed insulatively from the touch wires, the repair line comprises a repair section and a connection section electrically connected to each other, and an extension direction of the connection section is the same as an extension direction of the touch wires;

wherein the repair section corresponds to at least one of the touch wires, and an orthographic projection of the touch wire corresponding to the repair section on the touch display panel partially coincides with an orthographic projection of the repair section on the touch display panel.

In the display device provided by the embodiment of the present application, the touch display panel comprises a displaying region and a non-displaying region surrounding the displaying region; the touch electrode sets are located in the displaying region, the touch electrode sets are disposed along a first direction, and the touch electrodes in each of the touch electrode sets are disposed along a second direction; the extension directions of the touch wires and the connection section are parallel to the second direction, and a first end of the connection section and a first end of the touch wires extend along the second direction from the displaying region to the non-displaying region; an orthographic projection of the touch wires on a corresponding one of the touch electrode sets coincides with each of the touch electrodes of the corresponding one of the touch electrode sets; and the repair section is located in the non-displaying region, and an orthographic projection of some of the touch wires located in the non-displaying region on the touch display panel partially coincides with the orthographic projection of the repair section on the touch display panel.

In the display device provided by the embodiment of the present application, the touch display panel comprises an underlay, a first metal layer located on the underlay, an insulation layer located on the first metal layer, and a second metal layer located on the insulation layer, the touch wires are located on the first metal layer, and the touch electrodes are located on the second metal layer; and wherein a plurality of first via holes are defined in the insulation layer, and each of the touch wires is electrically connected to one of the touch electrodes in the touch electrode sets through one of the first via holes.

In the display device provided by the embodiment of the present application, the connection section and the repair section in the repair line are disposed in a same layer.

In the display device provided by the embodiment of the present application, the connection section and the touch wires in the repair line are disposed in a same layer, and the connection section and the touch electrodes in the repair line are disposed in a same layer.

In the display device provided by the embodiment of the present application, a conductive pad is disposed in an overlapping region of the touch wires and the repair line.

In the display device provided by the embodiment of the present application, the repair line is at least one of metal line or metal oxide line.

In the display device provided by the embodiment of the present application, the touch electrode sets form a touch electrode array, and the connection section in the repair line is disposed between adjacent two of the touch electrode sets or is located outside the touch electrode array.

In the display device provided by the embodiment of the present application, the touch electrode sets form a touch electrode array, and the connection section in the repair line is disposed between adjacent two of the touch electrode sets or is located outside the touch electrode array.

In the display device provided by the embodiment of the present application, the repair line comprises a first repair line and a second repair line, the first repair line comprises a first repair section and a first connection section electrically connected to each other, and the second repair line comprises a second repair section and a second connection section electrically connected to each other; and wherein an orthographic projection of the first repair section on the touch display panel coincides with an orthographic projection of M of the touch wires on the touch display panel, an orthographic projection of the second repair section on the touch display panel coincides with an orthographic projection of N of the touch wires on the touch display panel, N is a positive integer greater than or equal to 1, and M is greater than or equal to N.

Advantages

Compared to the prior art, the touch display panel and the display device provided by the embodiment of the present application, by disposing at least one repair line, disposes the repair line insulatively from corresponding touch wires. Furthermore, the repair line comprises a repair section and a connection section electrically connected to each other. An extension direction of the connection section is the same as an extension direction of the touch wires. The repair section corresponds to at least one of the touch wires. An orthographic projection of the touch wire corresponding to the repair section on the touch display panel partially coincides with an orthographic projection of the repair section on the touch display panel, such that it is convenient to adopt a process such as a laser cutting and melting process at an end of the touch wire connected to the touch electrode coinciding with a projection of the repair section to electrically connect the broken touch wire and repair section when the touch wire is found broken during module inspection, which realizes effective repair to the broken touch wire of the touch display panel to further improve the product yield of the display panel.

DETAILED DESCRIPTION OF PREFERRED EMBODIMENTS

Figure 1:
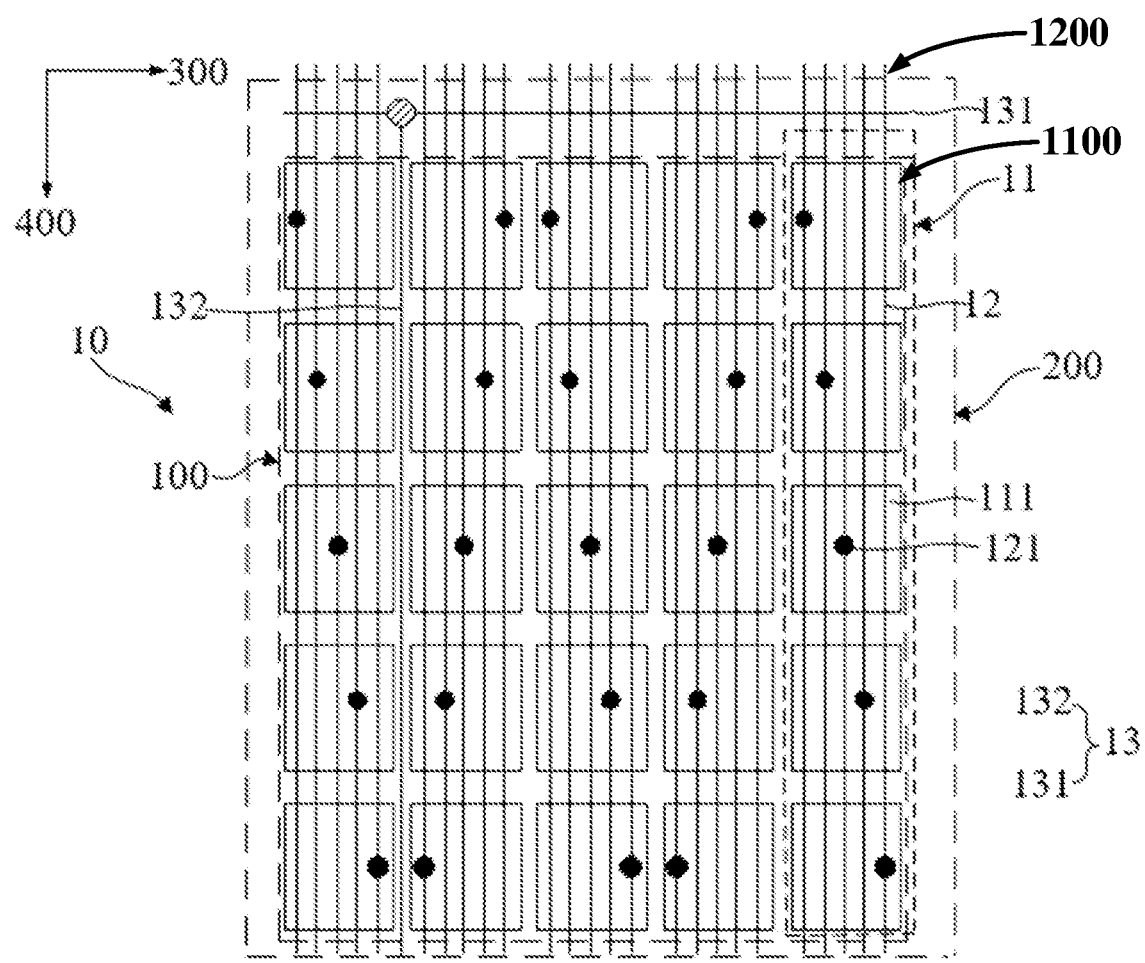
FIG. 1 is a top view of a touch display panel provided by a first embodiment of the present application.

The embodiment of the present application aims at the technical issue that in conventional touch display panel and display device, touch wires are easily broken during production because an actual effective conductive electrode area of touch electrodes is smaller, such that a touch function of the display panel becomes worse, which results in the entire display panel to be scrapped. The embodiment of the present application can solve the above technical issue.

With reference to FIGS. 1 to 7, the embodiment of the present application provides a touch display panel 10 comprising a plurality of touch electrode sets 11, a plurality of touch wires 12, and at least one repair line 13;

Each of the touch electrode sets 11 comprises a plurality of touch electrodes 111 disposed insulatively from each other. Adjacent two of the touch wires 12 are disposed insulatively from each other, one of the touch wires 12 corresponds to one of the touch electrode sets 11, and is connected to one of the touch electrodes 111 in a corresponding one of the touch electrode sets 11. The repair line 13 is disposed insulatively from the touch wires 12, the repair line 13 comprises a repair section 131 and a connection section 132 electrically connected to each other, and an extension direction of the connection section 132 is the same as an extension direction of the touch wires 12.

The repair section 131 corresponds to at least one of the touch wires 12, and an orthographic projection of the touch wire 12 corresponding to the repair section 131 on the touch display panel 10 partially coincides with an orthographic projection of the repair section 131 on the touch display panel 10.

Now the specific embodiments are combined to describe the technical solution of the present application.

First Embodiment

With reference to FIG. 1, FIG. 1 is a top view of a touch display panel 10 provided by a first embodiment of the present application. The touch display panel 10 provided by the present embodiment comprises: a plurality of touch electrode sets 11, a plurality of touch wires 12, and at least one repair line 13.

Each of the touch electrode sets 11 comprises a plurality of touch electrodes 111 disposed insulatively from each other. Adjacent two of the touch wires 12 are disposed insulatively from each other, one of the touch wires 12 corresponds to one of the touch electrode sets 11, and is connected to one of the touch electrodes 111 in a corresponding one of the touch electrode sets 11. The repair line 13 is disposed insulatively from the touch wires 12, the repair line 13 comprises a repair section 131 and a connection section 132 electrically connected to each other, and an extension direction of the connection section 132 is the same as the extension direction of the touch wires 12.

The repair section 131 corresponds to at least one of the touch wires 12, and an orthographic projection of the touch wire 12 corresponding to the repair section 131 on the touch display panel 10 partially coincides with an orthographic projection of the repair section 131 on the touch display panel 10.

Furthermore, the touch display panel 10 comprises a displaying region 100 and a non-displaying region 200 disposed around the displaying region 100.

The touch electrode sets 11 are located in the displaying region 100, the touch electrode sets 11 are disposed along a first direction 300, and the touch electrodes 111 in each of the touch electrode sets 11 are disposed along a second direction 400.

The extension directions of the touch wires 12 and the connection section 132 are parallel to the second direction 400. A first end of the connection section 132 and a first end of the touch wire 12 extend along the second direction 400 from the displaying region 100 to the non-displaying region 200.

An orthographic projection of the touch wires 12 on a corresponding one of the touch electrode sets 11 coincides with each of the touch electrodes 111 of the corresponding one of the touch electrode sets 11.

The repair section 131 is located in the non-displaying region 200, an orthographic projection of some of the touch wires 12 located in the non-displaying region 200 on the touch display panel 10 partially coincides with the orthographic projection of the repair section 131 on the touch display panel 10.

Furthermore, the touch wire 12 corresponds to one of the touch electrode sets 11, and is electrically connected to one of the touch electrodes 111 of a corresponding one of the touch electrode sets 11 through a first via hole 121.

In the embodiment of the present application, the connection section 132 in the repair line 13 is disposed between adjacent two of the touch electrode sets 11.

In a solution of the embodiment of the present application, the connection section 132 and the repair section 131 in the repair line 13 are disposed in a same layer. The connection section 132 in the repair line 13 and the touch electrodes 111 are disposed in a same layer. An intersection portion between the connection section 132 and the repair section 131 has a conductive via hole, and the connection section 132 and the repair section 131 are electrically connected to each other through the conductive via hole.

In another solution of the embodiment of the present application, the connection section 132 in the repair line 13 and the touch wires 12 are disposed in a same layer. The connection section 132 of the repair line 13 and the touch electrodes 111 are disposed in a same layer.

In the present embodiment, the touch wire 12 is electrically connected to a corresponding one of the touch electrodes 111 through the first via hole 121. The present embodiment disposes the touch wire 12 to connect with a driver chip. Therefore, the touch wire 12 receives a touch signal and transmits the signal to the corresponding the touch electrode 111 through the first via hole 121. When the touch wire 12 is broken, it results in the touch wire 12 being unable to transmit the touch signal to the corresponding touch electrode 111.

When one of the touch wires 12 in the touch display panel 10 is broken, by electrically connecting the broken touch wire 12 to the repair line 13 in a different layer, the repair section 131 of the repair line 13 is electrically connected to the broken touch wire 12. Because the repair section 131 is electrically connected to the connection section 132 of the repair line 13, the broken touch wire 12 is electrically connected to the connection section 132. In the meantime, the connection section 132 is electrically connected to the driver chip in the non-displaying region 200 such that the repair line 13 forms a new touch signal transmission line. As such, the repair and conduction of the broken touch wire 12 is achieved.

Aiming at the technical issue that touch wires are easily broken during manufacturing of a conventional display panel including a touch function, which makes the touch function of the display panel worse and further causes the entire display panel to be scrapped, the first embodiment of the present application disposes at least one repair line 13 and disposes the repair line 13 insulatively from a corresponding touch wire 12, and the repair line 13 comprises a repair section 131 and a connection section 132 electrically connected to each other. Extension directions of the connection section 132 and the touch wire 12 are the same. The repair section 131 corresponds to the at least one touch wires 12. An orthographic projection of the touch wire 12 corresponding to the repair section 131 on the touch display panel 10 partially coincides with an orthographic projection of the repair section 131 on touch display panel 10, such that it is convenient to use a process such as a laser cutting and melting process on a projection coincidence portion of an end of the touch wire 12 connected to the touch electrodes 111 and the repair section 131 when the touch wire 12 is found broken during module inspection to make the broken touch wires 12 electrically connect with the repair section 131, which achieves effective repair to the broken touch wire 12 in the touch display panel 10 to further improve the product yield of the touch display panel 10.

Second Embodiment

Figure 2:
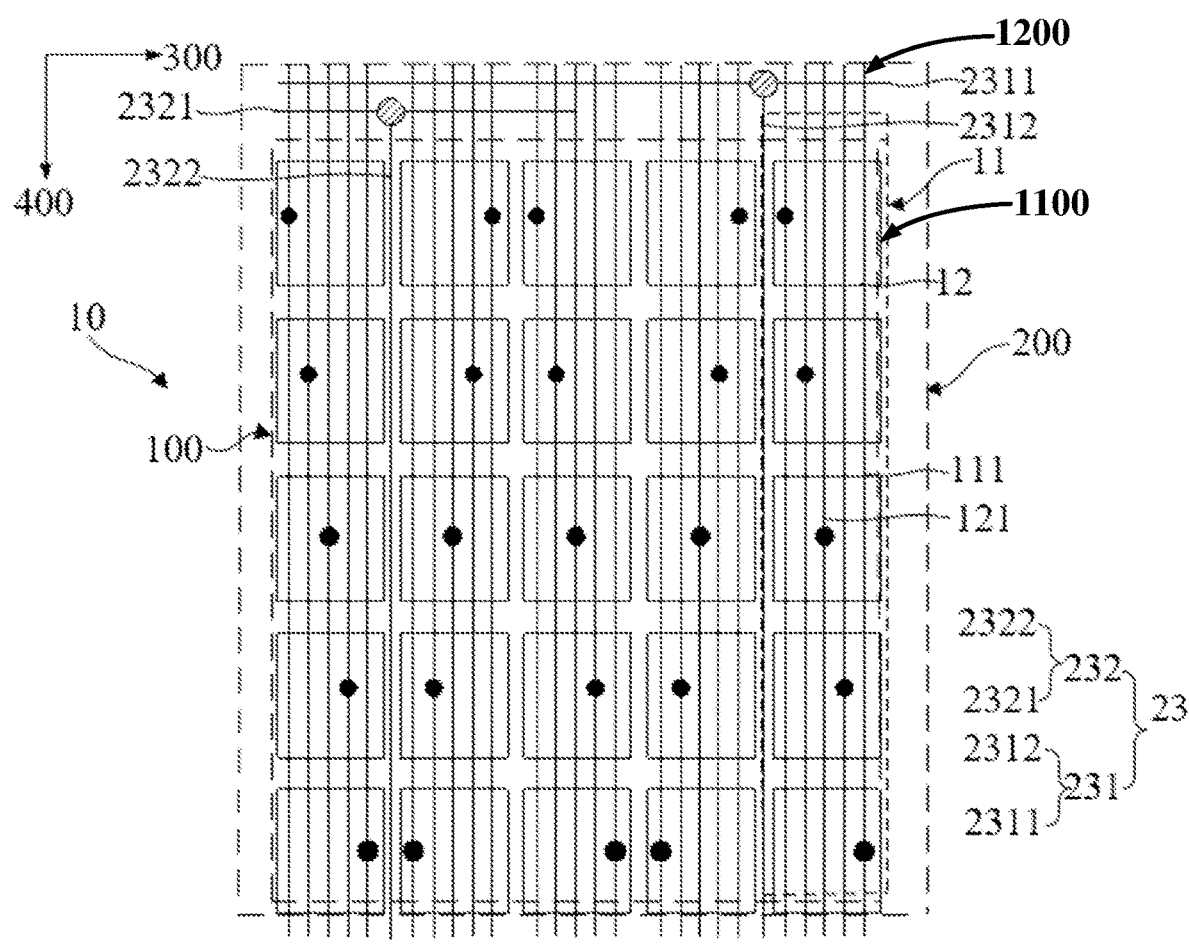
FIG. 2 is a top view of a touch display panel provided by a second embodiment of the present application.

With reference to FIG. 2, FIG. 2 is a top view of a touch display panel provided by a second embodiment of the present application. The touch display panel 10 provided by the present embodiment comprises: a plurality of touch electrode sets 11, a plurality of touch wires 12, and a repair line 23. The repair line 23 comprises a first repair line 231 and a second repair line 232.

Each of the touch electrode sets 11 comprises a plurality of touch electrodes 111 disposed insulatively from each other. Adjacent two of the touch wires 12 are disposed insulatively from each other, one of the touch wires 12 corresponds to one of the touch electrode sets 11, and is connected to one of the touch electrodes 111 in a corresponding one of the touch electrode sets 11. The repair line 23 is disposed insulatively from the touch wires 12, and the first repair line 231 comprises a first repair section 2311 and a first connection section 2312 electrically connected to each other. An extension direction of the first connection section 2312 is the same as an extension direction of the touch wires 12. The second repair line 232 comprises a second repair section 2321 and a second connection section 2322 electrically connected to each other. An extension direction of the second connection section 2322 is the same as the extension direction of the touch wires 12.

The first repair section 2311 corresponds to at least one of the touch wires 12. An orthographic projection of the touch wires 12 corresponding to the first repair section 2311 on the touch display panel 10 partially coincides with an orthographic projection of the first repair section 2311 on the touch display panel 10. The second repair section 2321 corresponds to at least one of the touch wires 12. An orthographic projection of the touch wires 12 corresponding to the second repair section 2321 on the touch display panel 10 partially coincides with an orthographic projection of the second repair section 2321 on the touch display panel 10.

In the embodiment of the present application, an orthographic projection of the first repair section 2311 on the touch display panel 10 coincides with an orthographic projection of M of the touch wires 12 on the touch display panel 10, the second repair section 2321 on the touch display panel 10 coincides with an orthographic projection of N of the touch wires 12 on the touch display panel 10, wherein N is a positive integer greater than or equal to 1, and M is greater than or equal to N. As such, it is guaranteed that when a plurality of the touch wires 12 are broken at the same time, the broken touch wires 12 are repaired at the same time.

In the embodiment of the present application, the first connection section 2312 and the second connection section 2322 are disposed between adjacent two of the touch electrode sets 11 respectively, and such arrangement can effectively reduce lengths of the first connection section 2312 and the second connection section 2322.

Furthermore, the touch display panel 10 comprises a displaying region 100 and a non-displaying region 200 disposed around the displaying region 100.

The touch electrode sets 11 are located in the displaying region 100, and the touch electrode sets 11 are disposed along the first direction 300. The touch electrodes 111 in each of the touch electrode sets 11 are disposed along the second direction 400.

The extension directions of the touch wires 12 and the first connection section 2312 and the second connection section 2322 are parallel to the second direction 400. A first end of the first connection section 2312, a first end of the second connection section 2322, and a first end of the touch wire 12 extend along the second direction 400 from the displaying region 100 to the non-displaying region 200.

An orthographic projection of the touch wires 12 on a corresponding one of the touch electrode sets 11 coincides with each of the touch electrodes 111 of the corresponding one of the touch electrode sets 11.

Both the first repair section 2311 and the second repair section 2321 are located in the non-displaying region 200. An orthographic projection of some of the touch wires 12 located in the non-displaying region 200 on the touch display panel 10 partially coincides with an orthographic projection of each of the first repair section 2311 and the second repair section 2321 on the touch display panel 10.

Furthermore, the touch wire 12 corresponds to one of the touch electrode sets 11, and is electrically connected to one of the touch electrodes 111 of a corresponding one of the touch electrode sets 11 through a first via hole 121.

In a solution of the embodiment of the present application, the connection section and the repair section in the repair line 23 are disposed in a same layer, and the connection section in the repair line 23 and the touch electrodes 111 are disposed in a same layer. An intersection portion of the connection section and the repair section of the repair line 23 has a conductive via hole, and the connection section and the repair section in the repair line 23 are directly connected to each other through the conductive via hole.

In another solution of the embodiment of the present application, the connection section in the repair line 23 and the touch wires 12 are disposed in a same layer, and the connection section in the repair line 23 and the touch electrodes 111 are disposed in a same layer.

In the present embodiment, the touch wire 12 is electrically connected to corresponding ones of the touch electrodes 111 to through the first via hole 121. The present embodiment disposes the touch wire 12 electrically connected to a driver chip. Therefore, the touch wire 12 receives a touch signal through the first via hole 121 and transmits the signal to the corresponding touch electrode 111. When the touch wire 12 is broken, it results in the touch wire 12 not being able to transmit the touch signal to the corresponding touch electrode 111.

When the plurality of touch wires 12 in the touch display panel 10 are broken, the broken touch wires 12 are electrically connected to the repair line 23 in a different layer, and the repair section of the repair line 23 is electrically connected to the broken touch wires 12. Because of electrical connection between the repair section and the connection section, the broken touch wires 12 are electrically connected to the connection section. In the meantime, the connection section is electrically connected to the driver chip in the non-displaying region 200, such that the repair line 23 forms a new touch signal transmission line. Therefore, repair and conduction of the broken touch wires 12 is achieved.

Aiming at the technical issue that touch wires are easily broken during manufacturing of a conventional display panel including a touch function, which makes the touch function of the display panel worse and further causes the entire display panel to be scrapped, the second embodiment of the present application disposes at least two repair lines 23 and disposes the repair lines 23 insulatively from corresponding touch wires 12, and the repair line 23 comprises a repair section and a connection section electrically connected to each other. Extension directions of the connection section and the touch wires 12 are the same. The repair section corresponds to at least one of the touch wires 12. In the meantime, an orthographic projection of the repair section of one of the repair lines on the touch display panel coincides with an orthographic projection of M of the touch wires on the touch display panel 10, and an orthographic projection of the repair section of another repair line on the touch display panel 10 coincides with an orthographic projection of N of the touch wires on the touch display panel 10. N is a positive integer greater than or equal to 1, and M is greater than or equal to N, such that a plurality of the broken touch wires 12 can be repaired simultaneously. Therefore, it is convenient to use a process such as a laser cutting and melting process on a projection coincidence portion of an end of the touch wire 12 connected to the touch electrodes 111 and the repair section 131 when the touch wire 12 is found broken during module inspection to make the broken touch wires 12 electrically connect with the repair section 131, which achieves effective repair to the broken touch wire 12 in the touch display panel 10 to further improve the product yield of the touch display panel 10.

Third Embodiment

Figure 3:
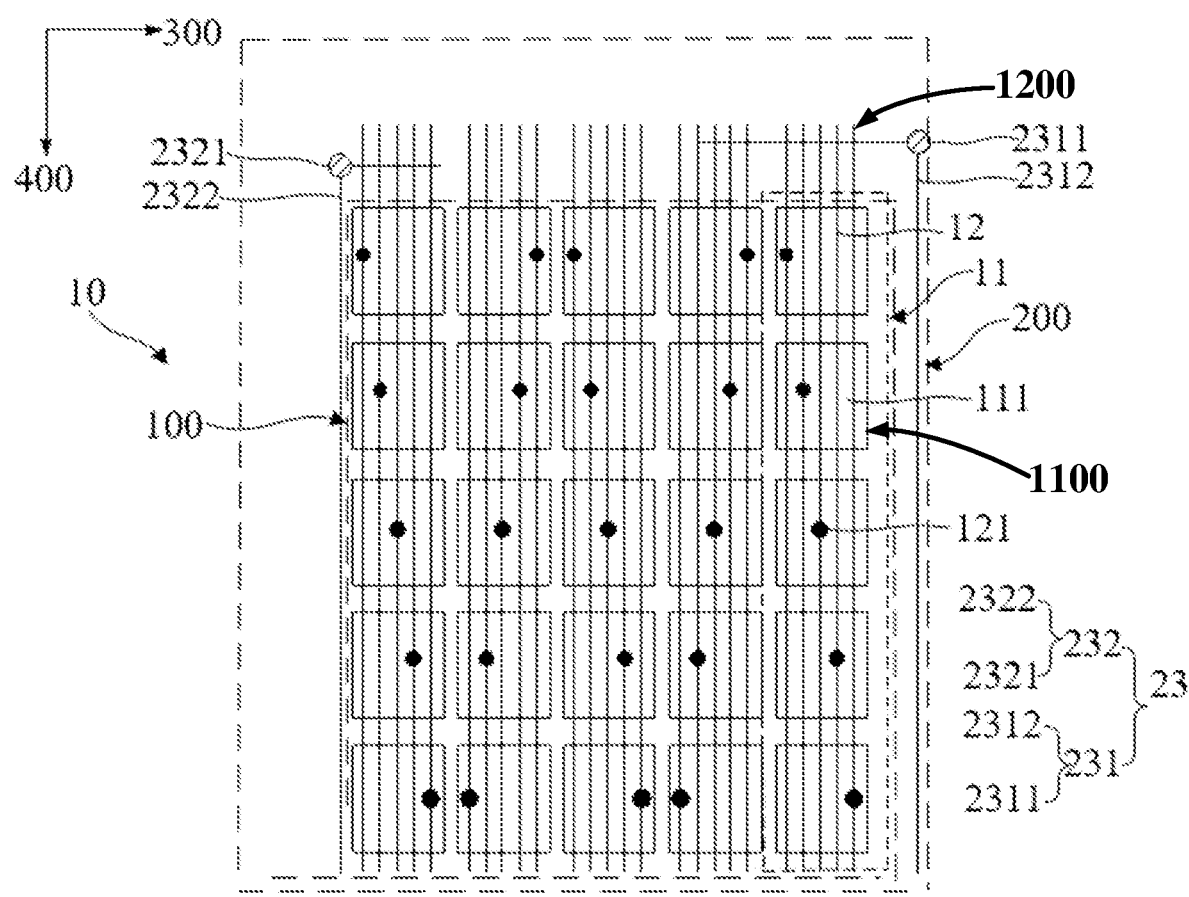
FIG. 3 is a top view of a touch display panel provided by a third embodiment of the present application.

With reference to FIG. 3, FIG. 3 is a top view of a touch display panel 10 provided by a third embodiment of the present application. The touch display panel 10 provided by the present embodiment comprises: a plurality of touch electrode sets 11, a plurality of touch wires 12, and a repair line 23. The repair line 23 comprises a first repair line 231 and a second repair line 232.

Each of the touch electrode sets 11 comprises a plurality of touch electrodes 111 disposed insulatively from each other. Adjacent two of the touch wires 12 are disposed insulatively from each other, one of the touch wires 12 corresponds to one of the touch electrode sets 11, and is connected to one of the touch electrodes 111 in a corresponding one of the touch electrode sets 11. The repair line 82 is disposed insulatively from the touch wires 12, and the first repair line 231 comprises a first repair section 2311 and a first connection section 2312 electrically connected to each other. An extension direction of the first connection section 2312 is the same as an extension direction of the touch wires 12. The second repair line 232 comprises a second repair section 2321 and a second connection section 2322 electrically connected to each other. An extension direction of the second connection section 2322 is the same as the extension direction of the touch wires 12.

The first repair section 2311 corresponds to at least one of the touch wires 12. An orthographic projection of the touch wires 12 corresponding to the first repair section 2311 on the touch display panel 10 partially coincides with an orthographic projection of the first repair section 2311 on the touch display panel 10. The second repair section 2321 corresponds to at least one of the touch wires 12. An orthographic projection of the touch wires 12 corresponding to the second repair section 2321 on the touch display panel 10 partially coincides with an orthographic projection of the second repair section 2321 on the touch display panel 10.

In the embodiment of the present application, an orthographic projection of the first repair section 2311 on the touch display panel 10 coincides with an orthographic projection of M of the touch wires 12 on the touch display panel 10, the second repair section 2321 on the touch display panel 10 coincides with an orthographic projection of N of the touch wires 12 on the touch display panel 10, wherein N is a positive integer greater than or equal to 1, and M is greater than or equal to N. As such, it is guaranteed that when a plurality of the touch wires 12 are broken at the same time, the broken touch wires 12 are repaired at the same time.

In the embodiment of the present application, the touch electrode sets 11 form a touch electrode array, and the first connection section 2312 and the second connection section 2322 are located outside the touch electrode array, and such arrangement can reduce impedance formed between each of the first repair line 231 and the second repair line 232 and the touch wires.

Furthermore, the touch display panel 10 comprises a displaying region 100 and a non-displaying region 200 disposed around the displaying region 100.

The touch electrode sets 11 are disposed in the displaying region 100, the touch electrode sets 11 are disposed along a first direction 300, and the touch electrodes 111 in each of the touch electrode sets 11 are disposed along a second direction 400.

The extension directions of the touch wires 12, the first connection section 2312, and the second connection section 2322 are parallel to the second direction 400. A first end of the first connection section 2312, a first end of the second connection section 2322, and a first end of the touch wires 12 extend along the second direction 400 from the displaying region 100 to the non-displaying region 200.

An orthographic projection of the touch wires 12 on a corresponding one of the touch electrode sets 11 coincides with each of the touch electrodes 111 of the corresponding one of the touch electrode sets 11.

Both the first repair section 2311 and the second repair section 2321 are located in the non-displaying region 200. An orthographic projection of some of the touch wires 12 located in the non-displaying region 200 on the touch display panel 10 partially coincides with an orthographic projection of each of the first repair section 2311 and the second repair section 2321 on the touch display panel 10.

Furthermore, the touch wire 12 corresponds to one of the touch electrode sets 11, and is electrically connected to one of the touch electrodes 111 of a corresponding one of the touch electrode sets 11 through a first via hole 121.

In a solution of the embodiment of the present application, the connection section and the repair section in the repair line 23 are disposed in a same layer, and the connection section in the repair line 23 and the touch electrodes 111 are disposed in a same layer. An intersection portion of the connection section and the repair section of the repair line 23 has a conductive via hole, and the connection section and the repair section in the repair line 23 are directly connected to each other through the conductive via hole.

In another solution of the embodiment of the present application, the connection section in the repair line 23 and the touch wires 12 are disposed in a same layer, and the connection section in the repair line 23 and the touch electrodes 111 are disposed in a same layer.

In the present embodiment, the touch wire 12 is electrically connected to corresponding ones of the touch electrodes 111 to through the first via hole 121. The present embodiment disposes the touch wire 12 electrically connected to a driver chip. Therefore, the touch wire 12 receives a touch signal through the first via hole 121 and transmits the signal to the corresponding touch electrode 111. When the touch wire 12 is broken, it results in the touch wire 12 not being able to transmit the touch signal to the corresponding touch electrode 111.

When the plurality of touch wires 12 in the touch display panel 10 are broken, the broken touch wires 12 are electrically connected to the repair line 23 in a different layer, and the repair section of the repair line 23 is electrically connected to the broken touch wires 12. Because of electrical connection between the repair section and the connection section, the broken touch wires 12 are electrically connected to the connection section. In the meantime, the connection section is electrically connected to the driver chip in the non-displaying region 200, such that the repair line 23 forms a new touch signal transmission line. Therefore, repair and conduction of the broken touch wires 12 is achieved.

Aiming at the technical issue that touch wires are easily broken during manufacturing of a conventional display panel including a touch function, which makes the touch function of the display panel worse and further causes the entire display panel to be scrapped, the third embodiment of the present application disposes at least two repair lines 23 and disposes the repair lines 23 insulatively from corresponding touch wires 12, and the repair line 23 comprises a repair section and a connection section electrically connected to each other. Extension directions of the connection section and the touch wires 12 are the same. The repair section corresponds to at least one of the touch wires 12. In the meantime, an orthographic projection of the repair section of one of the repair lines on the touch display panel coincides with an orthographic projection of M of the touch wires on the touch display panel 10, and an orthographic projection of the repair section of another repair line on the touch display panel 10 coincides with an orthographic projection of N of the touch wires on the touch display panel 10. N is a positive integer greater than or equal to 1, and M is greater than or equal to N, such that a plurality of the broken touch wires 12 can be repaired simultaneously. Therefore, it is convenient to use a process such as a laser cutting and melting process on a projection coincidence portion of an end of the touch wire 12 connected to the touch electrodes 111 and the repair section 131 when the touch wire 12 is found broken during module inspection to make the broken touch wires 12 electrically connect with the repair section 131, which achieves effective repair to the broken touch wire 12 in the touch display panel 10 to further improve the product yield of the touch display panel 10. In another aspect, the connection section of the repair line 23 is disposed outside the touch electrode array, and such arrangement can reduce impedance formed between the repair line 23 and the touch wires 12.

In the above embodiment of the present application, material of the above repair line is metal line, metal oxide line, or other conductive material.

In the above embodiment of the present application, the touch display panel 10 comprises an underlay, a first metal layer 1200 located on the underlay, an insulation layer located on the first metal layer 1200, and a second metal layer 1100 located on the insulation layer. The touch wires 12 are located on the first metal layer 1200, and the touch electrodes 111 are located on the second metal layer 1100.

A plurality of first via holes 121 are defined in the insulation layer, and each of the touch wires 12 is electrically connected to a corresponding one of the touch electrodes 111 in the touch electrode sets 11 through the first via holes 121.

In the above embodiment of the present application, a conductive pad can also be disposed on an overlapping region between the touch wires 12 and the repair line and an overlapping region between different repair lines. Before the conductive pad is melted, the conductive pad is disposed insulatively between the repair line and the touch wires in different layers, and is disposed between the repair lines in different layers. When melted, metal material of the conductive pad electrically connects the repair lines and the touch wires in different layers, and electrically connects the repair lines in different layers to achieve repair to the broken touch wires.

Figure 4:
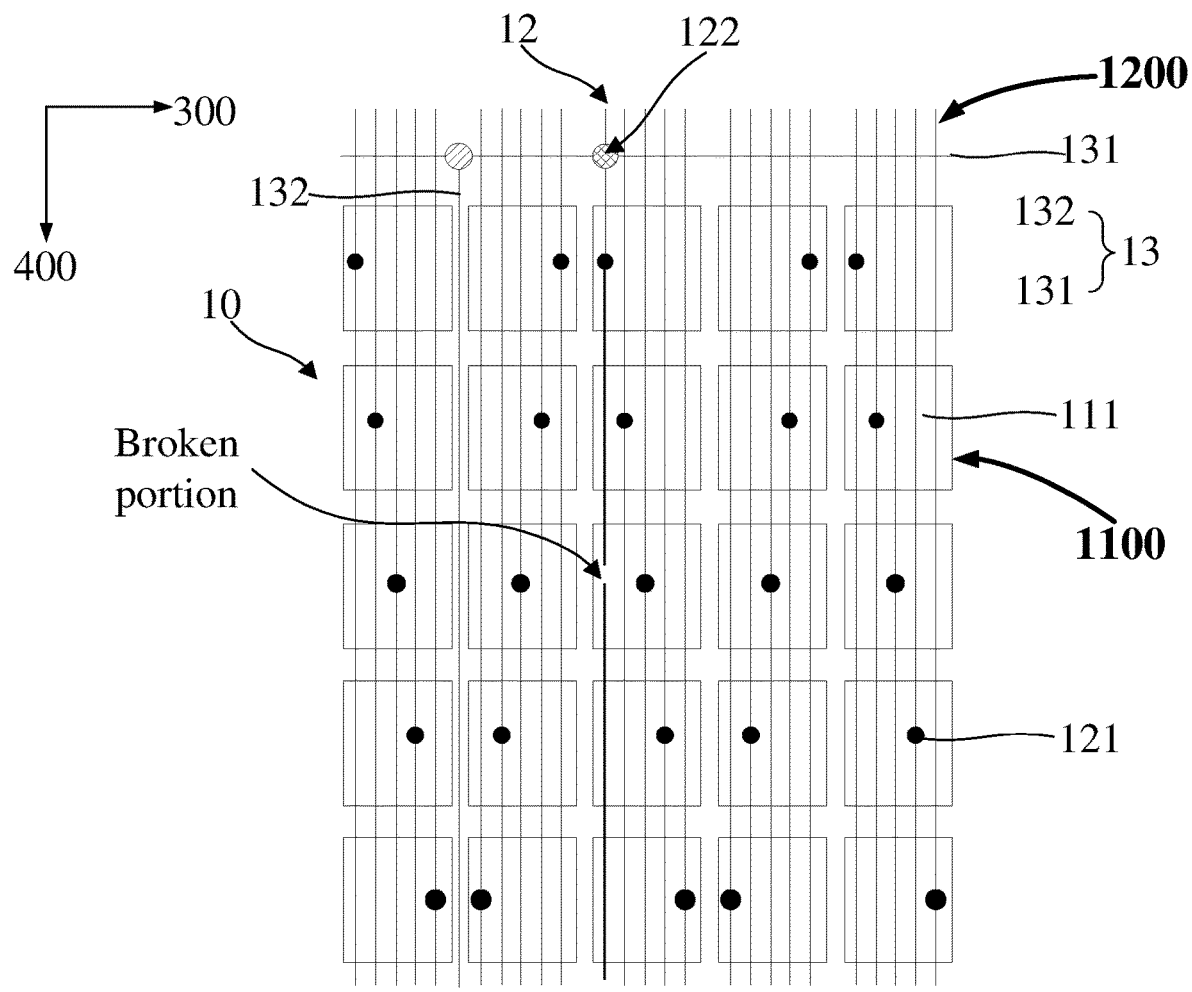
FIG. 4 is a top view of the touch display panel provided by the embodiment of the present application after repairing.

With reference to FIG. 4, FIG. 4 is a top view of the touch display panel provided by the embodiment of the present application after repairing. An end of the broken touch wires 12 is connected to the touch electrode 111 through the first via hole 121. Another end of the broken touch wires 12 is electrically connected to the repair section 131 of the repair line 13 through a second via hole 122. As such, the touch electrodes 111 are connected to the repair line 13 through the broken touch wire 12 to achieve effective repair to the broken touch wire 12 in the touch display panel 10 to further improve the product yield of the touch display panel 10.

Because the repair section 131 of the repair line 13 and the broken touch wire 12 are disposed in different layers, a film layer between the repair section 131 and the broken touch wire 12, after a laser cutting and melting process, forms the conductive second via hole 122.

Figure 5:
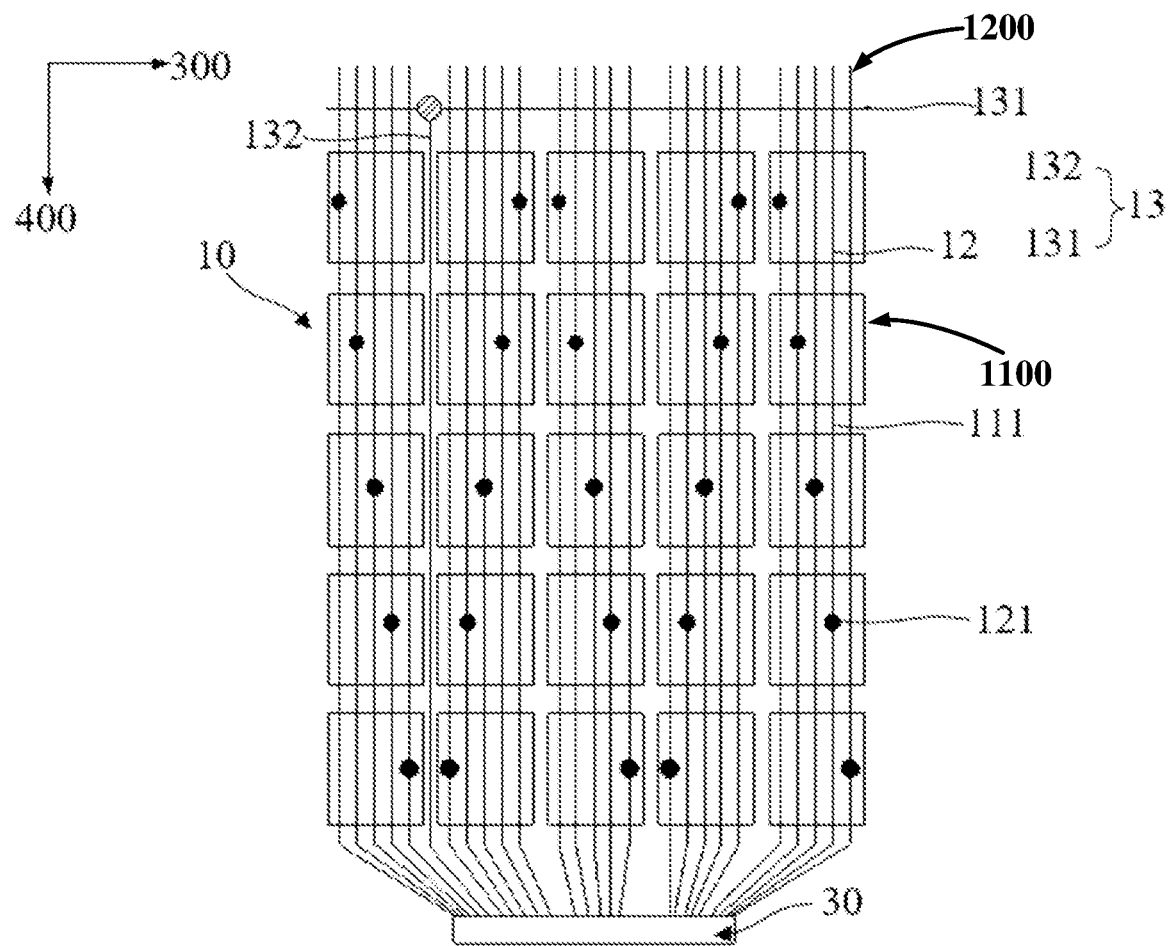
FIG. 5 is a top view of a display device provided by the embodiment of the present application.

With reference to FIG. 5, the embodiment of the present application further provides a display device, The display device is mainly used in liquid crystal displays (LCDs), plasma displays (PDDs), and active matrix organic light emitting diode display devices, and has a broad application space in vehicles, mobile phones, tablets, computers, and TV products.

The display device comprises any one of the above touch display panel 10 and touch chip 30. Each of the touch wires 12 is electrically connected to the touch chip 30. A first end of the connection section 132 is electrically connected to the repair section 131, and a second end of the connection section 132 is electrically connected to the touch chip 30.

Figure 6:
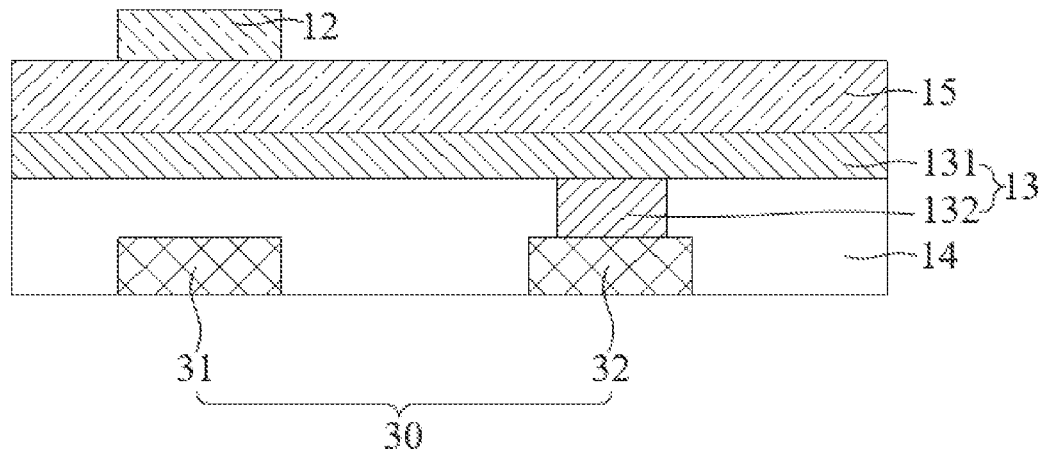
FIG. 6 is a schematic cross-sectional view of the display device provided by the embodiment of the present application with a broken portion of a touch wire before repair.

With reference to FIG. 6, FIG. 6 is a schematic cross-sectional view of the display device provided by the embodiment of the present application with a broken portion of a touch wire before repair, wherein the touch chip 30 comprises a first driver channel 31 disconnected from the touch wires 12 and a first repair channel 32 electrically connected to the repair line 13. A buffer layer 14 is disposed between the repair line 13 and the touch chip 30. An insulation layer 15 is further disposed on the repair line 13. Material of the buffer layer 14 and the insulation layer 15 is silicide nitride or silicide oxide. The broken touch wires 12 are disposed on the insulation layer 15, and the touch wires 12 are disposed opposite to the first driver channel 31.

Figure 7:
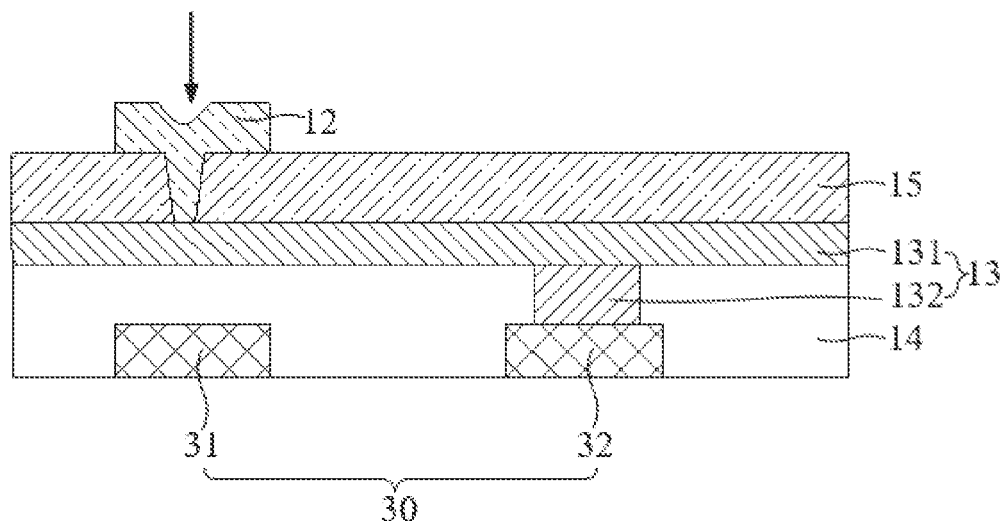
FIG. 7 is a schematic cross-sectional view of the display device provided by the embodiment of the present application with the broken portion of the touch wire after repair.

With reference to FIG. 7, FIG. 7 is a schematic cross-sectional view of the display device provided by the embodiment of the present application with the broken portion of the touch wire after repair. When the first driver channel 31 is broken, a laser cutting process is employed to cut and melt the insulation layer 15 such that the touch wire 12 is electrically connected to the repair section 131 of the repair line 13, and the repair section 131 of the repair line 13 is electrically connected to the first repair channel 32 through the connection section 132 of the repair line 13 to form a new touch signal transmission line, which achieves repairing the broken touch wire 12 of the display device while improving the product yield of the display panel.

The above embodiments of the present application mainly provide an integrated touch screen repair solution, especially for the repair solution after touch wires are broken in the touch screen self-capacitance solution of foldable cell phones.

The above embodiment of the present application reserves a spare channel of touch electrodes in the driver chip, and electrically connects the broken touch electrodes through the repair line. The spare channel of the touch electrodes can be one, and can be plural, and a location thereof is on two sides or a middle.

Furthermore, all of the touch wires of the above embodiment of the present application extend to an upper portion of the array substrate to intersect the first repair line and both of which are disposed in different layers. When a certain one of the touch electrodes is in a broken state, the reserved insulation layer on an upper portion of the reserved first repair line and the touch wire having issues on the intersection portion can be removed to achieve electrical connection thereof, such that the touch sensor having issues can be repaired.

Specific embodiments of each of the above operations can refer to the embodiments above, and will not be described repeatedly here.

As described above, the embodiment of the present application provides the touch display panel and the display device, and the touch display panel, by disposing at least one repair line, disposes the repair line insulatively from corresponding touch wires. Furthermore, the repair line comprises a repair section and a connection section electrically connected to each other. An extension direction of the connection section is the same as an extension direction of the touch wires. The repair section corresponds to at least one of the touch wires. An orthographic projection of the touch wire corresponding to the repair section on the touch display panel partially coincides with an orthographic projection of the repair section on the touch display panel, such that it is convenient to adopt a process such as a laser cutting and melting process at an end of the touch wire connected to the touch electrode coinciding with a projection of the repair section to electrically connect the broken touch wire and repair section when the touch wire is found broken during module inspection, which achieves effective repair to the broken touch wire of the touch display panel to further improve the product yield of the display panel.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A touch display panel, comprising:
a plurality of touch electrode sets, wherein each of the touch electrode sets comprises a plurality of touch electrodes disposed insulatively;
a plurality of touch wires, wherein adjacent two of the touch wires are disposed insulatively from each other, one of the touch wires corresponds to one of the touch electrode sets, and is connected to one of the touch electrodes in a corresponding one of the touch electrode sets; and
at least one repair line, wherein the repair line is disposed insulatively from the touch wires, the repair line comprises a repair section and a connection section electrically connected to each other, and an extension direction of the connection section is the same as an extension direction of the touch wires;
wherein the repair section corresponds to at least one of the touch wires, and an orthographic projection of the touch wire corresponding to the repair section on the touch display panel partially coincides with an orthographic projection of the repair section on the touch display panel;
wherein the touch display panel comprises a displaying region and a non-displaying region surrounding the displaying region;
the touch electrode sets are located in the displaying region, the touch electrode sets are disposed along a first direction, and the touch electrodes in each of the touch electrode sets are disposed along a second direction;
the extension directions of the touch wires and the connection section are parallel to the second direction, and a first end of the connection section and a first end of the touch wires extend along the second direction from the displaying region to the non-displaying region;
an orthographic projection of the touch wires on a corresponding one of the touch electrode sets coincides with each of the touch electrodes of the corresponding one of the touch electrode sets; and
the repair section is located in the non-displaying region, and an orthographic projection of some of the touch wires located in the non-displaying region on the touch display panel partially coincides with the orthographic projection of the repair section on the touch display panel;
wherein the touch display panel comprises an underlay, a first metal layer located on the underlay, an insulation layer located on the first metal layer, and a second metal layer located on the insulation layer; the touch wires are located on the first metal layer, and the touch electrodes are located on the second metal layer; and
wherein a plurality of first via holes are defined in the insulation layer, and each of the touch wires is electrically connected to one of the touch electrodes in the touch electrode sets through one of the first via holes.

2. The touch display panel according to claim 1, wherein the connection section and the repair section in the repair line are disposed in a same layer.

3. The touch display panel according to claim 1, wherein the connection section and the touch wires in the repair line are disposed in a same layer, and the connection section and the touch electrodes in the repair line are disposed in a same layer.

4. The touch display panel according to claim 1, wherein a conductive pad is disposed in an overlapping region of the touch wires and the repair line.

5. The touch display panel according to claim 1, wherein the repair line is at least one of metal line or metal oxide line.

6. The touch display panel according to claim 1, wherein the touch electrode sets form a touch electrode array, and the connection section in the repair line is disposed between adjacent two of the touch electrode sets or is located outside the touch electrode array.

7. The touch display panel according to claim 1, wherein the touch electrode sets form a touch electrode array, and the connection section in the repair line is disposed between adjacent two of the touch electrode sets or is located outside the touch electrode array.

8. The touch display panel according to claim 6, wherein the repair line comprises a first repair line and a second repair line, the first repair line comprises a first repair section and a first connection section electrically connected to each other, and the second repair line comprises a second repair section and a second connection section electrically connected to each other; and wherein an orthographic projection of the first repair section on the touch display panel coincides with an orthographic projection of M of the touch wires on the touch display panel, an orthographic projection of the second repair section on the touch display panel coincides with an orthographic projection of N of the touch wires on the touch display panel, N is a positive integer greater than or equal to 1, and M is greater than or equal to N.

9. A display device, wherein the display device comprises a touch display panel and a touch chip;

wherein the touch display panel comprises:
a plurality of touch electrode sets, wherein each of the touch electrode sets comprises a plurality of touch electrodes disposed insulatively;
a plurality of touch wires, wherein adjacent two of the touch wires are disposed insulatively from each other, one of the touch wires corresponds to one of the touch electrode sets, and is connected to one of the touch electrodes in a corresponding one of the touch electrode sets; and
at least one repair line, wherein the repair line is disposed insulatively from the touch wires, the repair line comprises a repair section and a connection section electrically connected to each other, and an extension direction of the connection section is the same as an extension direction of the touch wires;
wherein the repair section corresponds to at least one of the touch wires, and an orthographic projection of the touch wire corresponding to the repair section on the touch display panel partially coincides with an orthographic projection of the repair section on the touch display panel;
wherein each of the touch wires is electrically connected to the touch chip, a first end of the connection section is electrically connected to the repair section, and a second end of the connection section is electrically connected to the touch chip;
wherein the touch display panel comprises a displaying region and a non-displaying region surrounding the displaying region;

the touch electrode sets are located in the displaying region, the touch electrode sets are disposed along a first direction, and the touch electrodes in each of the touch electrode sets are disposed along a second direction;
the extension directions of the touch wires and the connection section are parallel to the second direction, and the first end of the connection section and a first end of the touch wires extend along the second direction from the displaying region to the non-displaying region;
an orthographic projection of the touch wires on a corresponding one of the touch electrode sets coincides with each of the touch electrodes of the corresponding one of the touch electrode sets; and
the repair section is located in the non-displaying region, and an orthographic projection of some of the touch wires located in the non-displaying region on the touch display panel partially coincides with the orthographic projection of the repair section on the touch display panel;
wherein the touch display panel comprises an underlay, a first metal layer located on the underlay, an insulation layer located on the first metal layer, and a second metal layer located on the insulation layer; the touch wires are located on the first metal layer, and the touch electrodes are located on the second metal layer; and
wherein a plurality of first via holes are defined in the insulation layer, and each of the touch wires is electrically connected to one of the touch electrodes in the touch electrode sets through one of the first via holes.

10. The display device according to claim 9, wherein the connection section and the repair section in the repair line are disposed in a same layer.

11. The display device according to claim 9, wherein the connection section and the touch wires in the repair line are disposed in a same layer, and the connection section and the touch electrodes in the repair line are disposed in a same layer.

12. The display device according to claim 9, wherein a conductive pad is disposed in an overlapping region of the touch wires and the repair line.

13. The display device according to claim 9, wherein the repair line is at least one of metal line or metal oxide line.

14. The display device according to claim 9, wherein the touch electrode sets form a touch electrode array, and the connection section in the repair line is disposed between adjacent two of the touch electrode sets or is located outside the touch electrode array.

15. The display device according to claim 9, wherein the touch electrode sets form a touch electrode array, and the connection section in the repair line is disposed between adjacent two of the touch electrode sets or is located outside the touch electrode array.

16. The display device according to claim 14, wherein the repair line comprises a first repair line and a second repair line, the first repair line comprises a first repair section and a first connection section electrically connected to each other, and the second repair line comprises a second repair section and a second connection section electrically connected to each other; and wherein an orthographic projection of the first repair section on the touch display panel coincides with an orthographic projection of M of the touch wires on the touch display panel, an orthographic projection of the second repair section on the touch display panel coincides with an orthographic projection of N of the touch wires on the touch display panel, N is a positive integer greater than or equal to 1, and M is greater than or equal to N.

* * * * *